(12) United States Patent
Vadamalayan et al.

(10) Patent No.: US 12,112,439 B2
(45) Date of Patent: *Oct. 8, 2024

(54) SYSTEMS AND METHODS FOR IMMERSIVE AND COLLABORATIVE VIDEO SURVEILLANCE

(71) Applicant: Honeywell International Inc., Charlotte, NC (US)

(72) Inventors: MuthuRamji Vadamalayan, Chennai (IN); Deepakumar Subbian, Gland (CH); Kathiresan Periyasamy, Madurai (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/831,538

(22) Filed: Jun. 3, 2022

(65) Prior Publication Data

US 2022/0301270 A1    Sep. 22, 2022

Related U.S. Application Data

(63) Continuation of application No. 15/198,377, filed on Jun. 30, 2016, now Pat. No. 11,354,863.

(51) Int. Cl.
G06T 19/00   (2011.01)
G08B 13/196  (2006.01)
H04N 7/18    (2006.01)

(52) U.S. Cl.
CPC ...... *G06T 19/006* (2013.01); *G08B 13/19678* (2013.01); *H04N 7/183* (2013.01)

(58) Field of Classification Search
CPC .......... G06T 19/006; G08B 13/19678; H04N 7/183; G06F 30/20; G06F 30/13

USPC .............................................. 348/143; 703/1
See application file for complete search history.

(56) References Cited

U.S. PATENT DOCUMENTS

| 8,063,936 B2 | 11/2011 | Samarasekera et al. |
| 8,682,502 B2 | 3/2014  | Jurmain et al. |
| 9,065,987 B2 | 6/2015  | Kasmir et al. |
| 9,485,459 B2 | 11/2016 | Shoemake et al. |

(Continued)

FOREIGN PATENT DOCUMENTS

WO    2012153805 A1    11/2012

OTHER PUBLICATIONS

Giroptic 360cam | HD 360 degree camera | US Store, http://us.360.tv/en, May 31, 2016.

(Continued)

*Primary Examiner* — John W Miller
*Assistant Examiner* — Sean N. Haiem
(74) *Attorney, Agent, or Firm* — Seager, Tufte & Wickhem, LLP

(57) ABSTRACT

Systems and methods for immersive and collaborative video surveillance, in the commercial security industry are provided. Some methods can include receiving a video data stream from a surveillance camera in a monitored region via a cloud network, a user interface device of or coupled to a virtual reality headset displaying the video data stream, and the user interface device receiving user input corresponding to a movement of a user's body to navigate the video data stream and simulate the user navigating the monitored region from within the monitored region.

20 Claims, 2 Drawing Sheets

(56) References Cited

U.S. PATENT DOCUMENTS

| | | |
|---|---|---|
| 10,217,003 B2 | 2/2019 | Renkis |
| 10,242,501 B1 | 3/2019 | Pusch et al. |
| 2007/0005795 A1 | 1/2007 | Gonzalez |
| 2008/0263592 A1 | 10/2008 | Kimber et al. |
| 2010/0100256 A1 | 4/2010 | Jurmain et al. |
| 2010/0280836 A1 | 11/2010 | Lu et al. |
| 2012/0079119 A1 | 3/2012 | Gill et al. |
| 2012/0113145 A1 | 5/2012 | Adhikari et al. |
| 2013/0083003 A1* | 4/2013 | Perez .................. G06F 3/011 345/419 |
| 2014/0020072 A1 | 1/2014 | Thomas |
| 2014/0171039 A1* | 6/2014 | Bjontegard ........... H04L 67/535 455/414.1 |
| 2014/0375752 A1 | 12/2014 | Shoemake et al. |
| 2015/0029335 A1 | 1/2015 | Kasmir et al. |
| 2015/0124087 A1* | 5/2015 | Jones, Jr. ............... G08B 15/02 348/143 |
| 2015/0153922 A1* | 6/2015 | Ballard ............... H04W 12/084 345/156 |
| 2015/0309316 A1* | 10/2015 | Osterhout ........... G06F 3/03547 345/8 |
| 2015/0317418 A1* | 11/2015 | Sankarapandian ..... G06F 30/20 703/1 |
| 2015/0319411 A1 | 11/2015 | Kasmir et al. |
| 2015/0334344 A1 | 11/2015 | Shoemake et al. |
| 2015/0338915 A1* | 11/2015 | Publicover .............. G06F 3/017 345/633 |
| 2015/0341603 A1* | 11/2015 | Kasmir .................... H04N 5/33 340/584 |
| 2015/0379358 A1 | 12/2015 | Renkis |
| 2015/0381944 A1 | 12/2015 | Renkis |
| 2015/0381945 A1 | 12/2015 | Renkis |
| 2015/0381946 A1 | 12/2015 | Renkis |
| 2015/0381947 A1 | 12/2015 | Renkis |
| 2015/0381948 A1* | 12/2015 | Renkis .................. G06V 10/95 348/47 |
| 2016/0021344 A1 | 1/2016 | Renkis |
| 2016/0093105 A1* | 3/2016 | Rimon .................. G06Q 50/01 345/633 |
| 2016/0093108 A1* | 3/2016 | Mao ..................... G02B 27/017 345/633 |
| 2016/0127690 A1 | 5/2016 | Kaehler et al. |
| 2016/0178906 A1* | 6/2016 | Rider ........................ G06F 3/00 726/17 |
| 2016/0267759 A1* | 9/2016 | Kerzner ................. H04N 7/181 |
| 2016/0267884 A1 | 9/2016 | Binstock et al. |
| 2016/0316176 A1 | 10/2016 | Laska et al. |
| 2016/0379321 A1 | 12/2016 | Abraham et al. |
| 2017/0026635 A1 | 1/2017 | Nadler |
| 2017/0039829 A1 | 2/2017 | Kerzner |
| 2017/0102833 A1 | 4/2017 | Kodali et al. |
| 2017/0200252 A1* | 7/2017 | Nguyen ................. G09G 5/227 |
| 2017/0213387 A1* | 7/2017 | Bean ...................... G06F 3/012 |
| 2017/0263091 A1 | 9/2017 | Kerzner |
| 2017/0300758 A1 | 10/2017 | Renkis |

OTHER PUBLICATIONS

Google Cardboard—Google VR, https://vr.google.com/cardboard/index.html, May 31, 2016.

Samsung Gear VR—The Official Samsung Galaxy Site, http://www.samsung.com/global/galaxy/wearables/gear-vr/, May 31, 2016.

Epson Moverio BT-300 and BT-200 Smart Glasses-Epson America, Inc., http://www.epson.com/egi-bin/Store/jsp/Landing/moverio-augmented reality-smart-glasses.do, May 31, 2016.

Home-nod, https://nod.com/, May 31, 2016.

Extended European search report for corresponding EP patent application 17176465.7, dated Oct. 17, 2017.

Karchhi et al., A Review Paper on Oculus Rift, International Journal of Current Engineering and Technology, pp. 3589-3592, vol. 4, No. 5, Inpressco International Press Corporation, Oct. 20, 2014.

Chinese First Office Action, Patent Application No. 201710514775, pp. 12, dated May 29, 2020.

Office Action from India Patent Application No. 201714021580, pp. 5, dated Apr. 9, 2021.

Canadian Office Action, Canadian Patent Office, CA Application No. 2,971,586, Sep. 28, 2023 (6 pages).

* cited by examiner

SYSTEMS AND METHODS FOR IMMERSIVE AND COLLABORATIVE VIDEO SURVEILLANCE

This is a continuation of co-pending U.S. patent application Ser. No. 15/198,377, filed Jun. 30, 2016, entitled "SYSTEMS AND METHODS FOR IMMERSIVE AND COLLABORATIVE VIDEO SURVEILLANCE", which is incorporated herein by reference.

FIELD

The present invention relates generally to video surveillance. More particularly, the present invention relates to systems and methods for immersive and collaborative video surveillance.

BACKGROUND

Some known surveillance systems of large scale distributed sites, such as banks, refineries, and the like, include a central control room with a large wall of monitors for displaying video from surveillance cameras throughout the site as well as multiple operators for viewing the monitors and working together to monitor both steady state and crisis situations throughout the site, such as during alarm events. Operators or other users of these types of desktop-based systems can control the monitors and other parts of the system via user input devices, such as, for example, a joystick and the like. However, such control rooms are expensive and require the operators to be located in the same control room. Furthermore, because of the number of monitors in these types of control rooms, it can be difficult to identify some events, such as organized crime, parts of which may be displayed on many different monitors.

Cloud-based surveillance systems are also known for monitoring and controlling situations across multiple sites that are geographically distributed. For example, cloud-based surveillance systems can monitor and control small or medium sized businesses with multiple remote sites connected via a cloud network. In such systems, a central control room is not economically feasible so, while central monitoring stations exist in some known systems, they usually only monitor intrusion events.

Accordingly, users of known cloud-based surveillance systems monitor the system by remotely viewing surveillance video via a web or mobile interface and controlling the interface and other parts of the system via user input devices, such as, for example, a mouse, a touch-based screen, and the like. While useful, such interfaces fail to provide the user with an immersive experience of live and recorded video, similar to the experience of being in an on-site central control room. Indeed, while such interfaces can include two-dimensional or three-dimensional maps, a user must lay such maps side by side using a web or desktop application and use buttons, menu controls, or other input devices to operate on the maps, thereby preventing the simulation of a real-time experience of an on-site central control room. Furthermore, such interfaces require users at remote locations to share their viewing screens or communicate via a telephone to collaboratively investigate an incident rather than simultaneously viewing live or recorded video of a common scene.

In view of the above, there is a continuing, ongoing need for improved surveillance systems.

DETAILED DESCRIPTION

Figure 1A:
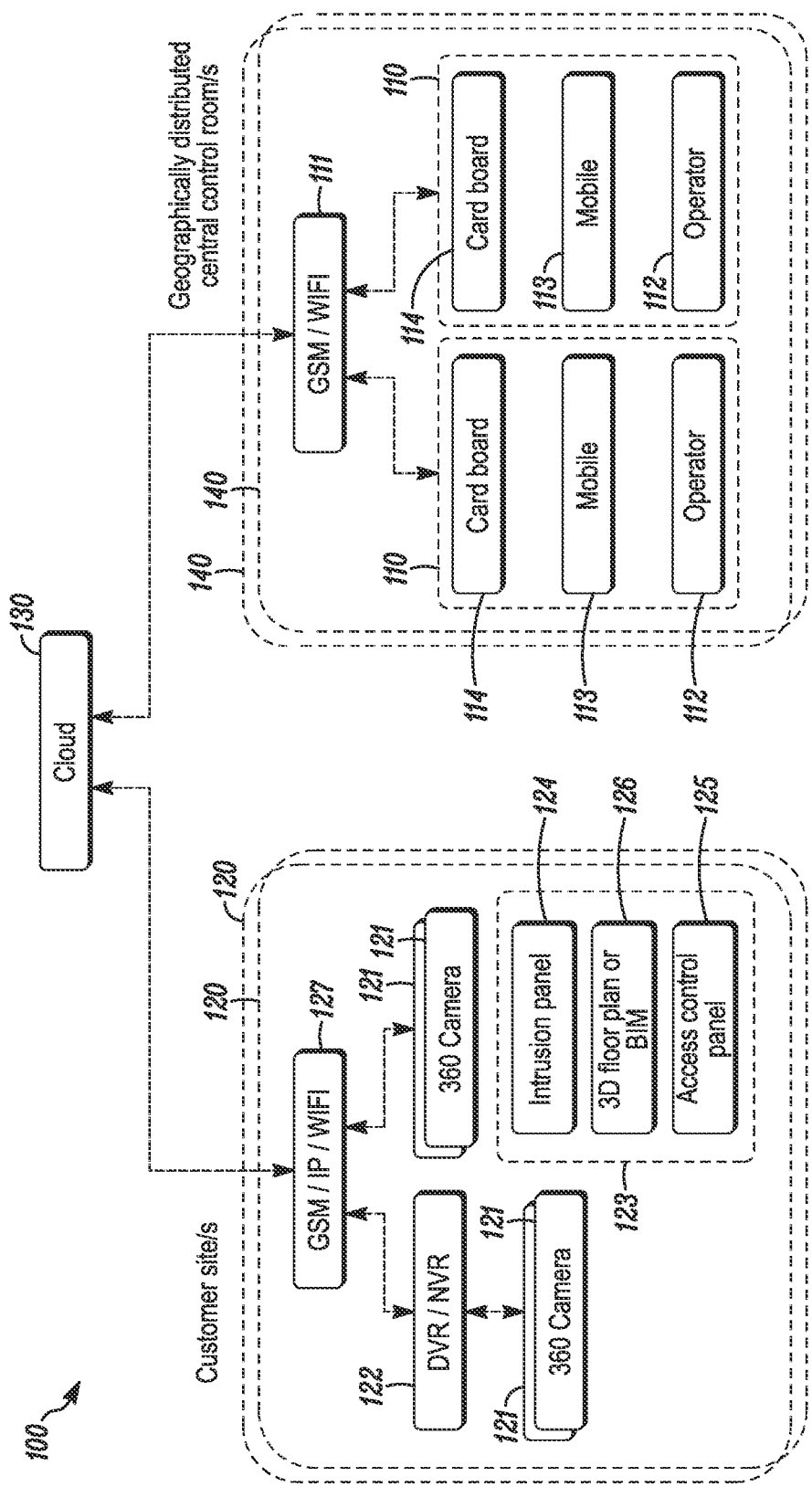
FIG. 1A is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for immersive and collaborative video surveillance, for example, in the commercial security industry. In some embodiments, systems and methods disclosed herein can facilitate a user or a plurality of users collaborating via a cloud network to perform video surveillance and investigations by simultaneously viewing video of a common scene. Furthermore, in some embodiments, systems and methods disclosed herein can combine one or more surveillance cameras with a cloud network based software as a service (SaaS) solution to facilitate a plurality of users performing remote and immersive video surveillance and collaborating via the cloud network.

In some embodiments, systems and methods disclosed herein can include a primary user interface, such as, for example, a three-dimensional virtual reality headset, via which a user can interact with a monitored region and view video of a common scene in the monitored region and that can allow the user to virtually inspect, tour, or walk through the monitored region. The video can be recorded or viewed in real time.

In some embodiments, the video of the common scene can include or be obtained from a three-dimensional BIM model of a floorplan of the monitored region, video from a two-dimensional surveillance camera, video from a 360° panoramic surveillance camera, and the like, via the cloud network. When the video of the common scene is obtained from a surveillance camera, the video and a representation of the camera can be overlaid on a representation of the BIM model or floorplan displayed on a user interface of the primary user interface, such as the virtual reality headset, and a user can rotate the user interface up, down, or side to side, by rotating his head up, down, or side to side, to see the video obtained by the camera at different angles, thereby virtually monitoring a region captured by the camera. In some embodiments, a representation of a human hand or finger can be overlaid on the representation of the BIM model or floorplan displayed on the user interface of the primary user interface, and a user can control the representation of the human hand or finger by providing input into the user interface to navigate through the video of the monitored region.

In some embodiments, a plurality of users can view video of the common scene via respective primary user interfaces. For example, in some embodiments, each of the plurality to users can view the video of the common scene via respective virtual reality headsets and can communicate with each other via the cloud network to exchange information.

In some embodiments, the status of access devices or intrusion devices in the monitored region can also be transmitted to the cloud network and viewed by a user via a respective primary user interface. For example, in some embodiments, the status of or other information related to devices in the monitored region can be overlaid on the video of the common scene in a location that corresponds to the location of the respective device in the monitored region. Accordingly, the user can monitor the status and health of the region as if he were inside of the region.

In some embodiments, systems and methods disclosed herein can construct a virtual command center, in lieu of an on-site central control room, via which users can view video of common scenes, communicate with each other, and view the status of devices in the monitored region, all via the cloud network. For example, in some embodiments a first user can view live video of a common scene while a second user can view recorded video of the common scene, and the first and second user can communicate with one other via the cloud network.

In accordance with disclosed embodiments, a user in a central control room, or any other user in any other location, can perform video surveillance and virtually experience being in a monitored region from which video is obtained. For example, a surveillance application can be installed and executed on a mobile device, such as, for example, a smart phone or other personal digital assistant, which can be mounted to a virtual reality headset, including a headset with an eyeglass shaped cardboard, a headset that receives a smart phone, glasses with lenses displaying video in a user's field of vision, a headset that communicates with a smart phone wirelessly or via a hard wired connection or mount, or any other virtual reality headset as would be known by those of skill in the art. In some embodiments, the surveillance application or the mobile device can be placed in a virtual reality mode to facilitate the user performing video surveillance.

Videos and photographs obtained from security cameras in a monitored region can be rendered by the surveillance application on the mobile device to facilitate a user of the mobile device monitoring the region as if he were inside of the region. Such video surveillance can aid in identifying human movement and interaction within a monitored region, such as in instances of organized crime that can be spread out over different areas of a monitored region, or can be used in forensic surveillance to identify and search for suspects as they enter into and move throughout a monitored region. For example, the cloud network as disclosed herein can process raw video obtained by cameras in the monitored region to ready the video for forensic searching and the like.

In some embodiments, a user of the surveillance application or the mobile device can control one or more devices in the monitored region via the surveillance application or the mobile device. For example, in some embodiments, a user can control a surveillance camera, an access control panel, or an intrusion panel in the monitored region by entering a voice command entered into mobile device. The surveillance application can process the received voice command and transmit a corresponding instruction signal to the respective device in the monitored region, via the cloud network.

Figure 1B:
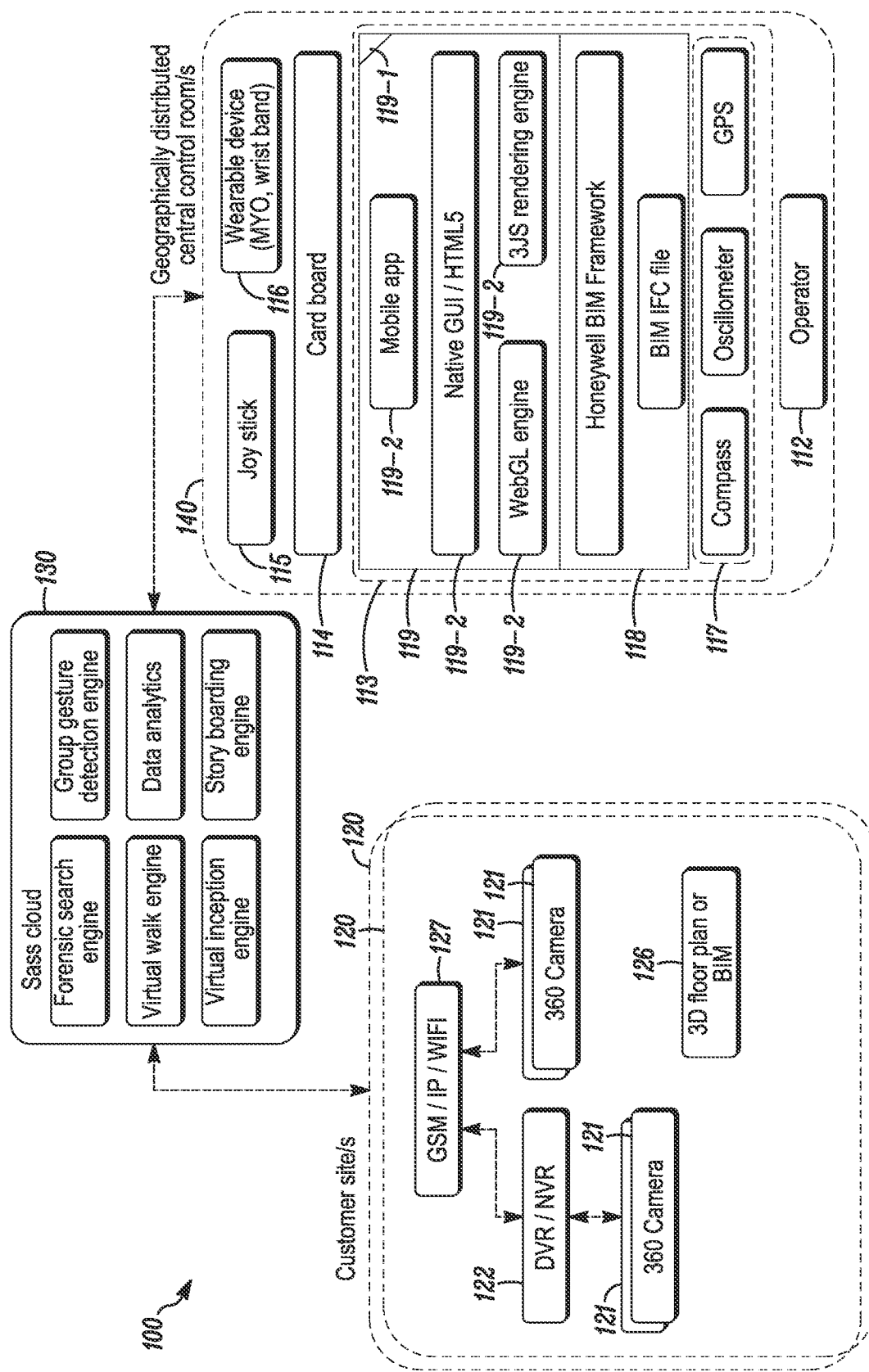
FIG. 1B is a block diagram of a system in accordance with disclosed embodiments.

FIG. 1A and FIG. 1B are block diagrams of a system 100 in accordance with disclosed embodiments. As seen in FIGS. 1A and 1B, the system 100 can include a plurality of user interface devices 110 communicating with a plurality of monitored regions 120 via a cloud network 130.

Each of the monitored regions 120 can include one or more surveillance cameras 121, one or more recording devices 122, and a control panel device 123 that includes an intrusion panel device 124, an access control panel device 125, and a three-dimensional floor plan or BIM 126 of the respective monitored region 120 stored in a memory device of the control panel device 123. As seen, one or more of the devices in the monitored region 120 can communicate with the cloud network 130 via a GSM, IP, or WiFi network 127.

Each of the user interface devices 110 can be geographically distributed, can be located inside or outside of one or more central control rooms 140, and can communicate with the cloud network 130 via a GSM or WiFi network 111. As best seen in FIG. 1A, in some embodiments, each of the user interface devices 110 can include a user 112 interacting with a mobile device 113, which can be coupled to a virtual reality headset 114, for example. In some embodiments, each of the user interface devices 110 can additionally or alternatively include a joystick 115 or a wearable device 116.

As best seen in FIG. 1B, the mobile device 113 can include one or more directional devices 117, such as a compass, oscillator, or GPS device. The mobile device 113 can also include a memory device 118, control circuitry 119, one or more programmable processors 119-1, and executable control software 119-2 stored on a non-transitory computer readable medium. In some embodiments, the control software 119-2 can include one or more of a surveillance application, a GUI or HTML application, a web engine, or a rendering engine, and the memory device 118 can include a floor plan or BIM file of one or more monitored regions 120.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method for monitoring a surveillance system of a facility having a plurality of surveillance devices including one or more access control devices, one or more intrusion detection devices and a plurality of video surveillance cameras, the method comprising:
   receiving a selection of one of the plurality of video surveillance cameras;
   receiving a video data stream captured by the selected video surveillance camera, wherein the selected video surveillance camera has a field of view that includes a corresponding monitored region of the facility;
   a first user interface device of a first virtual reality headset displaying:
      the video data stream to a first user; and
      a status of one or more of the plurality of surveillance devices;
   the first user interface device receiving a first user input corresponding to a movement of at least part of the first user's body;
   the first user interface device simulating the first user navigating the monitored region from within the monitored region by adjusting a presentation of the video data stream received from the surveillance camera in the monitored region in response to the first user input;
a second user interface device, remote from the first user interface device, displaying:
at least part of the video data stream that is displayed on the first user interface device presented from the same perspective as the video data stream is presented on the first user interface device, resulting in a common scene; and
the status of the one or more of the plurality of surveillance devices; and
the first user interface device transmitting and receiving audio communication signals to and from the second user interface device to allow the first user of the first user interface device and a second user of the second user interface device to investigate a security incident captured by the surveillance system by collaboratively discussing events observed in the common scene.

2. The method of claim 1, wherein the second user interface device is part of a second virtual reality headset.

3. The method of claim 1, wherein the audio communication signals are transmitted and received via a cloud network.

4. The method of claim 3, wherein the first user interface device of the first virtual reality headset receives the video data stream via the cloud network.

5. The method of claim 1, wherein the selected video surveillance camera is a 360 degree video surveillance camera.

6. The method of claim 1, wherein the first user interface device displays the video data stream overlaid on a representation of a BIM model or a floorplan of the monitored region.

7. The method of claim 1, wherein the video data stream is a recorded video data stream.

8. The method of claim 1, wherein the video data stream is a live video data stream.

9. A method for monitoring a surveillance system of a facility having a plurality of surveillance devices including one or more access control devices, one or more intrusion detection devices and a plurality of video surveillance cameras, the method comprising:
receiving a selection of one of the plurality of video surveillance cameras;
receiving a video data stream captured by the selected video surveillance camera via a cloud network, wherein the selected video surveillance camera has a field of view that includes a corresponding monitored region of the facility;
a first mobile device receiving the video data stream via the cloud network and displaying the video data stream to a first user;
the first mobile device receiving a status of one or more of the plurality of surveillance devices and displaying the status of one or more of the plurality of surveillance devices to the first user;
the first mobile device receiving a first user input from the first user that controls the display of the video data stream on the first mobile device;
a second mobile device, remote from the first mobile device, receiving the video data stream via the cloud network and displaying at least part of the video data stream that is displayed on the first mobile device to a second user;
the second mobile device receiving the status of one or more of the plurality of surveillance devices and displaying the status of one or more of the plurality of surveillance devices to the second user; and
the first mobile device and the second mobile device transmitting and receiving communication signals via the cloud network to support communications between the first user of the first mobile device and a second user of the second mobile device to collaborate while investigating events observed in the video data stream.

10. The method of claim 9, wherein the first mobile device is part of a first virtual reality headset.

11. The method of claim 10, wherein the first user input from the first user comprises a movement of the first user's body captured by the first virtual reality headset.

12. The method of claim 9, wherein the second mobile device is part of a second virtual reality headset.

13. The method of claim 9, wherein the first mobile device is located in the corresponding monitored region, and the second mobile device is located remote from the corresponding monitored region.

14. The method of claim 9, wherein the video data stream is a recorded video data stream previously captured by the selected video surveillance camera.

15. The method of claim 9, wherein the video data stream is a live video data stream captured by the selected video surveillance camera.

16. A surveillance system having a plurality of surveillance devices including one or more access control devices, one or more intrusion detection devices and a plurality of video surveillance cameras, the system comprising:
a primary mobile device;
a secondary mobile device remote from the primary mobile device;
wherein the primary mobile device receives via a cloud network at least part of a video data stream captured by a selected one of the plurality of video surveillance cameras located in a monitored region, and displays at least part of the received video data stream on the primary mobile device as well as a status of one or more of a plurality of surveillance devices;
wherein the secondary mobile device receives via the cloud network at least part of the video data stream captured by the selected one of the plurality of video surveillance cameras and displays:
at least part of the video data stream that is displayed on the primary mobile device in the same manner that the video data stream is displayed on the primary mobile device, resulting in a shared video data stream; and
the status of the one or more of the plurality of surveillance devices;
the primary mobile device and the secondary mobile device configured to transmit and receive communication signals to support communications between the primary user of the primary mobile device and a secondary user of the secondary mobile device to collaborate while investigating events observed in the shared video data stream.

17. The system of claim 16, wherein the primary mobile device comprises a primary virtual reality headset.

18. The system of claim 17, wherein the first user input from the primary user comprises a movement of at least part of the primary user's body captured by the primary virtual reality headset.

19. The system of claim 17, wherein the secondary mobile device comprises a secondary virtual reality headset.

20. The system of claim 16, wherein the video data stream is a recorded video data stream previously captured by the selected video surveillance camera and stored in the cloud network.

* * * * *